United States Patent
Marin et al.

(10) Patent No.: US 6,314,896 B1
(45) Date of Patent: Nov. 13, 2001

(54) METHOD FOR OPERATING A BOILER USING OXYGEN-ENRICHED OXIDANTS

(75) Inventors: Ovidiu Marin, Lisle; Oliver Charon, Chicago, both of IL (US)

(73) Assignees: L'Air Liquide, Societe Anonyme pour l'Etude et l'Exploitation des Procedes Georges Claude, Paris (FR); American Air Liquide, Countryside, IL (US)

( * ) Notice: Subject to any disclaimer, the term of this patent is extended or adjusted under 35 U.S.C. 154(b) by 0 days.

(21) Appl. No.: 09/437,526

(22) Filed: Nov. 10, 1999

Related U.S. Application Data

(63) Continuation-in-part of application No. 09/329,555, filed on Jun. 10, 1999.

(51) Int. Cl.$^7$ ..................................................... F23C 9/00
(52) U.S. Cl. ........................ 110/345; 110/204; 110/214; 110/254; 110/345
(58) Field of Search .................................. 110/204, 205, 110/210, 234, 238, 214, 254, 395; 122/199, 15, 176

(56) References Cited

U.S. PATENT DOCUMENTS

| | | | |
|---|---|---|---|
| 3,426,734 | * 2/1969 | Rickard et al. | 122/478 |
| 4,286,548 | * 9/1981 | Brash | 122/1 R |
| 4,495,874 | * 1/1985 | Greskovitch et al. | 110/347 |
| 4,515,095 | * 5/1985 | Greskovich | 110/347 |
| 4,547,351 | * 10/1985 | Im et al. | 423/242 |
| 4,656,972 | * 4/1987 | Shimoda | 122/4 D |
| 4,762,074 | * 8/1988 | Sorensen | 110/346 |
| 5,002,484 | * 3/1991 | Lofton et al. | 432/222 |
| 5,040,470 | * 8/1991 | Lofton et al. | 110/234 |
| 5,291,841 | * 3/1994 | Dykema | 110/347 |
| 5,309,850 | * 5/1994 | Downs et al. | 110/235 |
| 5,402,739 | * 4/1995 | Abboud et al. | 110/346 |
| 5,752,452 | * 5/1998 | Leger | 110/346 |
| 5,771,823 | * 6/1998 | Vierstra et al. | 110/347 |
| 5,918,555 | * 7/1999 | Winegar | 110/345 |
| 5,960,722 | * 10/1999 | Kiss | 110/229 |
| 5,992,337 | * 11/1999 | Phillipe et al. | 110/348 |

FOREIGN PATENT DOCUMENTS

1301852A * 4/1987 (SU) .

* cited by examiner

*Primary Examiner*—Henry Bennett
*Assistant Examiner*—K. B. Rinehart
(74) *Attorney, Agent, or Firm*—Jasper W. Dockrey; Brinks Hofer Gilson & Lione

(57) ABSTRACT

A method for operating a boiler using oxygen-enriched oxidants includes introducing oxygen-enriched air, or oxygen and air, in which the oxygen concentration ranges from about 21% to about 100% by volume. Fuel and oxygen-enriched air are introduced into the combustion space within the steam-generating boiler. The fuel and oxygen-enriched air is combusted to generate thermal energy. At least a portion of the flue gases are collected and at least a portion are recirculated through the boiler. In the steam-generating boiler, the oxygen-enriched oxidant is introduced at one or more locations within the radiation zone and the convection zone of the boiler. Additionally, flue gas is collected and recirculated into one or more locations within the radiation zone and/or the convection zone of the boiler. The amount of oxygen enrichment and the total gas flow through the boiler is controlled so as to maintain the heat transfer patterns within the boiler at the originally-design specification for operation by air combustion.

6 Claims, 4 Drawing Sheets

METHOD FOR OPERATING A BOILER USING OXYGEN-ENRICHED OXIDANTS

CROSS REFERENCE TO RELATED APPLICATION

This application is a continuation-in-part of application Ser. No 09/329,555 filed Jun. 10, 1999, the disclosure of which is incorporated by reference herein.

FIELD OF THE INVENTION

This invention relates, in general, to methods of operating steam-generating boilers and, more particularly, to methods for improving combustion conditions and operating efficiency in steam-generating boilers.

BACKGROUND OF THE INVENTION

Boilers are widely used to generate steam for numerous applications. In a water-tube boiler, combustion of stoker or pulverized coal and coke, or gas or oil fuels provide radiation to the boiler tubes. Further, heat transfer is accomplished by arranging the flow of hot gases over the tubes to provide convection-heat transfer. In a typical low-pressure boiler designed to generate 200,000 lb/hr of steam at 235 psig and 500° F., about 99° F. of superheat is required since the saturation temperature at this pressure is only 401° F. In some systems designed to generate the required amount of superheating, radiant boiler tubes cover an entire wall and roof surface within the boiler forming a "waterwall." With such systems, the temperature of the refractory walls is kept down, thus decreasing maintenance requirements. Often the water tubes are partially embedded in the walls. Typically, in this type of boiler, water is fed by gravity from the upper drums to headers at the bottom end of the waterwall tubes on all four radiant walls. Water circulation is upward through these tubes and the steam is disengaged from water in the upper drums of the boiler. The steam then passes through a steam separator before being superheated.

In a low-pressure boiler, the convection tubes reduce the flue gas temperature sufficiently such that the convection tubes can be routed directly to the air preheater, eliminating the need for a feed-water preheater sometimes referred to as an "economizer." The convection tubes are typically bent tubes running from the upper drums to the lower drums of the boiler. Water circulation in these tubes is, in general, downward in the cooler bank of tubes and upward through the hotter bank of tubes.

A typical power-generating steam boiler has a capacity of about 450,000 lb/hr of 900 psig steam delivered at about 875° F. Since the saturation temperature at 900 psig is 532° F., considerable superheating is required to obtain the steam delivery temperature. Because of the need for considerable superheat duty, little boiler convection surface can be placed between the radiant boiler and the superheater. This is because high-temperature combustion gases must be used to obtain the required superheat temperature while maintaining a reasonable superheater tube surface area. Since the feed water must be brought to the saturation temperature before it is admitted to the boiler drum, considerable heat is absorbed in the economizer section.

The thermal efficiency of the boiler can be further increased by preheating the combustion air with the flue gases before they are sent to the stack. In steam generating boilers, large amounts of fuel are needed for the combustion process. This is because of the need for superheating in order to achieve the required outlet steam temperatures of both low-pressure and power-generating steam boilers.

As the requirements for electrical energy continue to increase, improved operating methods are necessary in order to maintain fuel consumption and exhaust emissions within acceptable levels. Improvements in fuel combustion within steam generating boilers is one means to increase the operational efficiency of the boiler. However, any change in the combustion process within an existing steam-generating boiler must not take place without consideration of the thermodynamic processes within the boiler. For example, different heat transfer patterns within the various areas of the boiler such as the radiation zone and the convection zone, can lead to different localized vaporization/superheating rates of the steam. Nonuniform vaporization can lead to damage to the water tubes within the boiler. Additionally, non-uniform localized vapor superheating can lead to lower heat transfer coefficients, which can cause pipe overheating. Accordingly, when making alterations to the combustion process within the boiler, it is desirable to maintain relatively unchanged the originally designed heat transfer patterns within the boiler.

One method for increasing the efficiency of the combustion process is to use oxygen-enriched air as an oxidant. Oxygen-enriched combustion has been employed in numerous industrial applications such as glass, steel, aluminum and cement manufacturing. The use of oxygen-enriched air has led to significant process improvements such as fuel savings, production increases and expanded use of waste materials as fuel. Additionally, oxygen enrichment has been used for combustion in the lower central zone of recovery boilers in the pulp and paper industries.

The use of oxygen-enriched air is also employed in operation of boilers using coal-water-mixture (CWM). The results of experimentation conducted with a 700 HP water-tube boiler using bituminous CWM suggest that the use of oxygen-enriched air increased carbon burnout, reduced uncontrolled fly ash emissions and reduced combustion air preheating requirements. Additionally, the boiler efficiency increased because of reduced flue gas heat losses.

Although the use of oxygen-enriched air and oxygen-containing gases has been shown to improve boiler operation, further improvements are necessary to fully realize the increased operational efficiency potentially obtainable in large steam-generating boilers. The need to maintain thermodynamic balance within the radiation zone and convection zone of a large steam-generating boiler is necessary if existing boilers are to be retrofitted for oxygen enhanced combustion. Accordingly, a need exists for a method of operating a steam-generating boiler that fully utilizes oxygen enhanced combustion while maintaining parameters such as the flue gas mass flow rate and steam properties such as temperature, pressure, flow rate and the like within boiler design limits.

SUMMARY OF THE INVENTION

The present invention is for a method of operating a steam-generating boiler using premixed oxygen-enriched air exclusively or in combination with oxygen and air for fuel combustion within the boiler. The method of the present invention can be carried out with a wide variety of fuels including hydrocarbon gases, oil, CWM, low-calorie fuels and the like. The method of the present invention also results in minimizing the carbon content in ash produced by the combustion process. Additionally, the method of the present invention can lead to increased steam throughput, a reduction in fuel usage, reduced $NO_x$ emissions and improve the ability of the boiler to be operated with low-quality fuels such as carbonaceous waste materials and the like. The method of the present invention also allows adjustment in the turn down ratio over a wide range. Importantly, the method of the present invention enables the use of oxygen-enhanced combustion within a boiler originally designed for air combustion. Accordingly, the gas flow patterns and heat transfer characteristics within the boiler are not substantially altered from the originally-designed heat transfer patterns developed from unenriched air combustion.

In one aspect of the invention, oxygen-enriched air containing about 21 to about 100 percent by volume oxygen is introduced into one or more locations within a steam-generating boiler. In the process of the invention, oxygen-enriched air can be introduced into the radiation zone and/or intro the convection zone using one of several techniques such as oxygen premixing, oxygen lancing and oxygen burners. Additionally, the method of the invention also includes the introduction of recirculated flue gasses. The flue gas recirculation rate is adjusted to maintain temperature profile and the flow of flue gases within the originally-designed parameters for the subject boiler.

In another aspect of the invention, the amount of oxygen introduced at the various injection points in the boiler is predetermined depending upon the particular operational aspect of the boiler that is to be optimized. The specific amount of oxygen introduced at each predetermined location within the boiler is adjusted such that oxygen-enriched combustion is carried out within the boiler at a total volume metric oxygen concentration of between about 21% to about 100%.

In yet another aspect, a method of operating a steam-generating boiler is disclosed that includes a radiation zone and a convection zone includes introducing a fuel into the combustion space within the boiler. Either oxygen-enriched air or oxygen in combination with air is also introduced into the combustion space. The total oxygen concentration ranges from about 21% to about 100% by volume. The oxygen-enriched air is combusted with the fuel to generate thermal energy within the combustion space of the boiler. Flue gases are collected and recirculated through the boiler with the oxygen-enriched air.

DETAILED DESCRIPTION OF PREFERRED EMBODIMENTS

Figure 1:
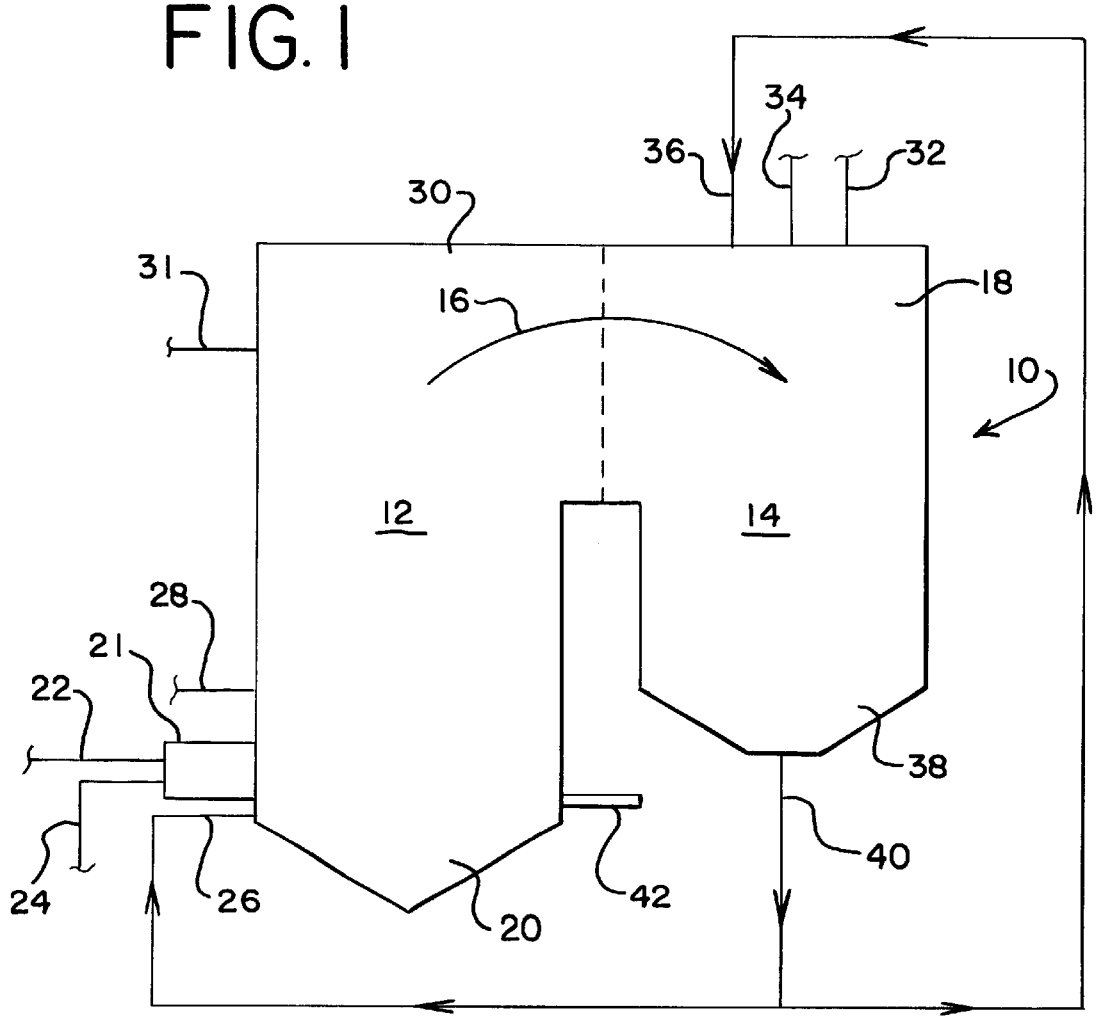
FIG. 1 is a schematic diagram of a high-capacity steam-generating boiler having a plurality of oxygen introduction sites arranged in accordance with the invention.

Shown in FIG. 1 is a cross-sectional schematic diagram of a high-capacity steam-generating boiler 10. Boiler 10 includes a radiation zone 12 and a convection zone 14. Those skilled in the art will appreciate that steam-generating boilers include a multitude of components such as water-tubes, steam-tubes, superheaters, boiler drums and the like. In general, the flow of water is upward through radiation zone 12 converting to steam in the upper regions of radiation zone 12. The superheated steam and hot water are transferred to convection zone 14 and exit through an outlet (not shown) at the upper portion of radiation zone 12. The flow of flue gases within boiler 10 is generally represented by arrow 16. In accordance with the invention, combustion of fuel introduced into boiler 10 can take place throughout radiation zone 12 and the upper region 18 of convection zone 14.

In accordance with the invention, oxygen-enriched air, or air and oxygen, or both, can be introduced at one or more locations in boiler 10. In one embodiment, one or more air burners 21 are attached and inserted into a lower portion 20 of radiation zone 12. Fuel is injected into air burner 21 through a fuel line 22. Preheated, oxygen-enriched air is introduced through oxidant line 24. Oxygen can be premixed with air either before or after the air preheater (not shown). Additionally, recirculated flue gas is introduced into lower portion 20 through flue gas recirculation line 26. Those skilled in the art will recognize that a variety of techniques are possible for introducing recirculated flue gas into boiler 10. For example, flue gas recirculation line 26 can be connected to fuel line 22 or to oxidant line 24. Alternatively, recirculated flue gas can be directly injected at one of several locations in radiation zone 12.

In addition to introducing oxygen-enriched air through air burner 21, oxygen can be injected by lancing into various stages of radiation zone 12. Oxygen-enriched air or oxygen can be lanced into lower portion 20 of radiation zone 12 through oxidant line 28. Additionally, the present invention contemplates the use of oxygen staging at one or more locations in radiation zone 12 beginning at lower portion 20 and extending to an upper portion 30 of radiation zone 12. For example, oxygen can be lanced into radiation zone 12 at upper portion 30 through an oxidant line 31. Although FIG. 1 depicts two oxygen introduction sites at stage levels above lower portion 20, it is to be understood that a plurality of such oxygen introduction stages can be employed at various locations between lower portion 20 and upper portion 30 of radiation zone 12.

The method of the present invention also contemplates the introduction of oxygen-enriched air or a combination of air and oxygen, or both, into boiler 10 within convection zone 14. For example, oxygen and fuel can be introduced in upper region 18 of convection zone 14 through a fuel line 32 and an oxidant line 34, respectively. The oxygen and fuel initiate combustion in upper region 18. Additionally, recirculated flue gas can be introduced in upper region 18 through flue gas recirculation line 36. The flue gases are collected at a lower region 38 of convection zone 14 and exit through a flue gas collection line 40.

In addition to providing an operating method in which oxygen-enriched air or oxygen and air can be introduced at various locations within boiler 10, the present invention also contemplates operation of boiler 10 using low-calorie fuel. Accordingly, boiler 10 can include an oxygen-enriched fuel burner 42 inserted into lower portion 20 of radiation zone 12 or into upper region 18 of convection zone 14. Low-calorie fuel such as carbonaceous waste, pulverized waste and the like can be entrained in air and introduced along with oxygen and combustion air through fuel burner 42.

Figure 2:
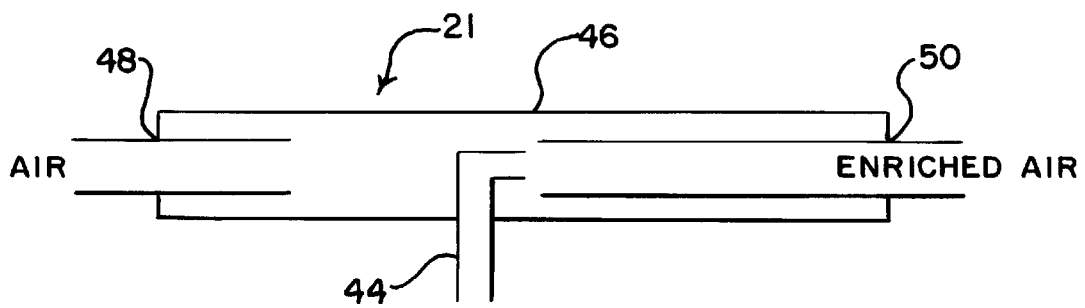
FIG. 2 is a cross-sectional schematic diagram of an oxygen sparger for premixing oxygen in accordance with the invention.

In accordance with the invention, various apparatus are used to introduce oxygen-enriched air or oxygen into boiler 10. For the introduction of preheated, oxygen-enriched air, preferably a convectional air burner such as an oxygen sparger is used to introduce premixed oxygen and air into the combustion space within radiation zone 12. In a preferred embodiment, the oxygen sparger is an oxygen delivery unit available from Air Liquide Corp. under the tradename "OXYNATOR." A cross-sectional schematic diagram of the air inlet 21 is illustrated in FIG. 2. Air inlet 21 includes an oxygen nozzle 44 mounted within a housing 46. Air is introduced through a port 48 at the rear of housing 46. The oxygen and air are mixed within air inlet 21 and ejected through an outlet port 50. Air inlet 21 effectively mixes oxygen and air and introduces an oxidant stream directly into the combustion space within radiation zone 12. Those skilled in the art will appreciate that other types of air inlet can also be employed to introduce premixed oxygen and air into a steam boiler before or after the preheater. Accordingly, variations and modifications can be made to the air inlet illustrated in FIG. 2 and all such variations and modifications are within the scope of the present invention.

Figure 3:
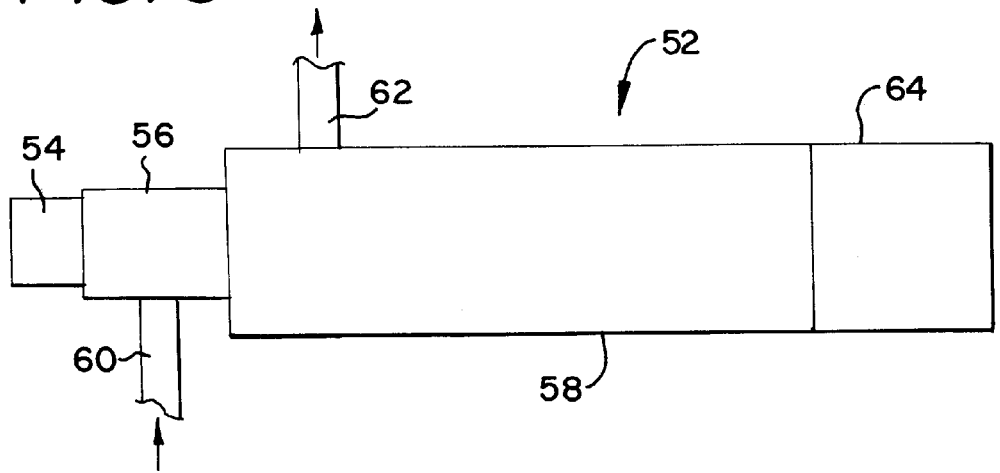
FIG. 3 is a cross-sectional schematic diagram of an oxygen lance useful for injecting oxygen in accordance with the invention.

FIG. 3 illustrates a cross-sectional schematic view of an oxygen lance 52. Oxygen lance 52 can be used for lancing oxygen directly into radiation zone 12. Oxygen lance 52 includes an oxygen inlet 54 encased by a first water cooling jacket 56. First water cooling jacket 56 is, in turn, encased by a second water cooling jacket 58. Water is introduced through inlet tube 60 and exits through outlet tube 62. Oxygen is lanced into radiation zone 12 through a nozzle 64. Those skilled in the art will recognize that the particular design of oxygen lance 52 is only one such design of an oxygen lance and that many other component arrangements of an oxygen lance are possible. Accordingly, all such other designs are contemplated by the present invention. Oxygen lance 52 can be coupled to oxidant lines 28 and 31 for lancing oxygen into radiation zone 12.

Figure 4:
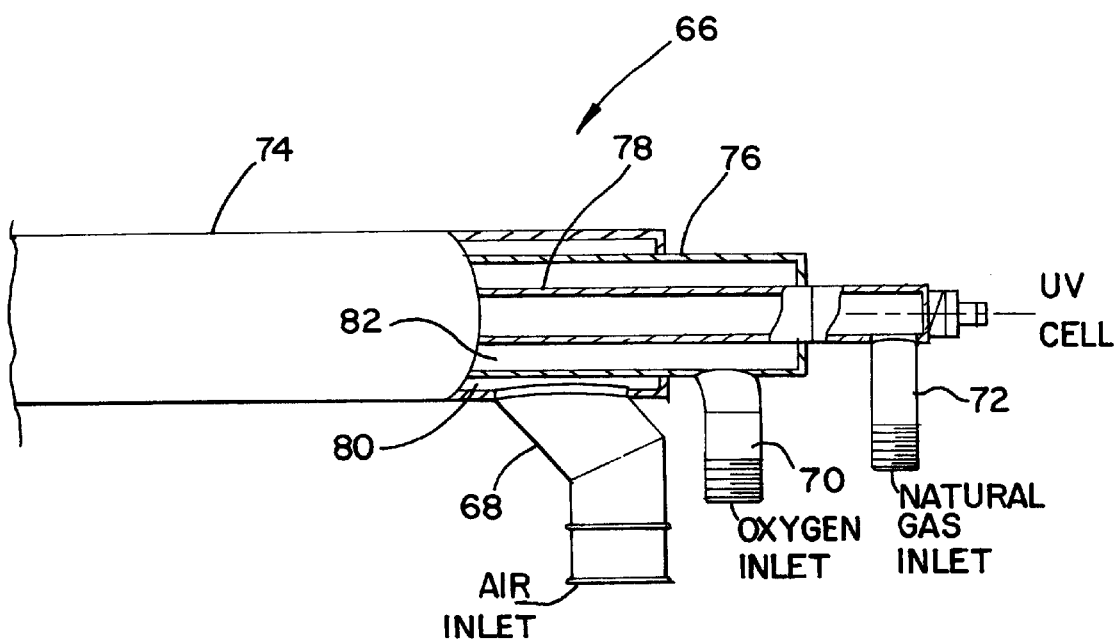
FIG. 4 is a cross-sectional schematic diagram of an oxygen burner useful for introducing oxygen into the convection zone of a steam-generating boiler in accordance with the invention.

FIG. 4 illustrates a partial cut-away, cross-sectional view of an oxygen burner 66. Oxygen burner 66 includes an air inlet 68, an oxygen inlet 70 and a fuel inlet 72. A housing 74 encloses a first tube 76 which encloses a second tube 78. Air that is introduced through air inlet 68 traverses an annular space 80 between housing 74 and first tube 76. Oxygen that is introduced through oxygen inlet 70 traverses an annular space 82 located between first and second tubes 76 and 78. Fuel that is introduced through fuel inlet 72 traverses the inner portion of second tube 78. Oxygen burner 66 accommodates the introduction of oxidizers and fuel for a combustion in upper region 18 of convection zone 14. In addition to air, air inlet 68 can also be used to introduce recirculated flue gas. In addition, inlet 68 can be closed altogether and a full oxy-burner can be employed. In the embodiment of the invention illustrated in FIG. 1, oxygen burner 66 can be coupled to fuel line 32, oxidant line 34 and flue gas recirculation line 36. Alternatively, combustion air can be introduced into oxygen burner 66 through air inlet 68 and a separate nozzle can be employed for the injection of recirculated flue gas through flue gas recirculation line 36.

In an alternative embodiment, a low calorie fuel can be introduced using the oxygen burner illustrated in FIG. 4. Those skilled in the art will appreciate that other arrangements for a low-calorie fuel and oxygen burner are possible. Accordingly, all such other arrangements of a low-calorie fuel burner for introducing fuels such as carbonaceous wastes and the like into a steam boiler are within the scope of the present invention. Additionally, a variety of methods can be used to introduce recirculated flue gas in boiler 10, including premixing with air, lancing and through burners.

The use of oxygen-enriched combustion in boiler 10 can both reduce the mass fraction of nitrogen and the combustion exhaust, and increase the adiabatic temperature of the combustion flame. Changes in exhaust composition and adiabatic flame temperature can increase localized heat transfer rates at various locations in the radiation zone of the boiler. In keeping with the original design parameter preservation of the invention, oxygen-enriched combustion is carried out while recirculating a predetermined mass flow rate of flue gas. The flow rate of recirculated flue gas is specified such that the flame temperature and the total mass flow rate through the boiler is kept approximately the same as for air combustion operation.

The controlled introduction of recirculated flue gas can be carried out through flue gas recirculation lines 26 and 36 shown in FIG. 1. In the method of the invention, both the extraction and the recirculation of flue gas in boiler 10 are optimized to maintain maximal operational efficiency. To achieve maximum operational efficiency, the temperature of the recirculated flue gas must be controlled to predetermined levels.

The flue gas recirculation flow rate, together with the oxygen-enriched air and fuel requirements are determined by the acceptable range of flame temperature and overall mass flow rate through the boiler. Using mass and energy conservation equations, a system of two equations can be written in terms of the fuel flow rate m and recirculated flue gas flow rate $m_R$ as unknown. The mass and energy conservation equations are given below as Equations (1) and (2), respectively.

$$\dot{m}_{total,bc} h_{bc,T_{ad,bc}} = \dot{m}_{total,o} h_{o,T_{ad,o}} + \dot{m}_R h_{R,T_R} \tag{1}$$

$$\dot{m}_{total,bc} = \dot{m}_{total,o} + \dot{m}_R, \tag{2}$$

Where the subscript bc refers to the base case (air combustion), o refers to the oxygen-enriched combustion operation and R refers to the flue gas recirculation stream and h is the specific enthalpy of the different streams at a given temperature. By solving Equations (1) and (2), the ratio between the oxygen-enriched case and the base case in terms of fuel consumption can be approximated as shown by Equation (3).

$$FS = \frac{\dot{m}_{f,o}}{\dot{m}_{f,bc}} = \frac{\Theta_{bc}}{\Theta_o} \frac{\bar{c}_{p,T_{ad,bc}} T_{ad,bc} - \bar{c}_{p,R} T_R}{\bar{c}_{p,T_{ad,o}} T_{ad,o} - \bar{c}_{p,R} T_R} \tag{3}$$

Where $\bar{c}_{p,T_{ad,bc}}$ is the specific heat capacity of the fuel for the base case and $\bar{c}_{p,T_{ad,o}}$ is the specific heat capacity for oxygen-enriched combustion, $\bar{c}_{p,R}$ is the specific heat capacity of recirculated flue gas, $T_{ad,bc}$ is the temperature of air combustion, $T_{ad,o}$ is the temperature for oxygen-enriched combustion and $T_R$ is the temperature of the recirculated flue gas. Nondimensional parameter $\Theta$ is defined as shown in Equation (4).

$$\Theta = \frac{\dot{m}_{total}}{\dot{m}_f}, \tag{4}$$

Figure 5:
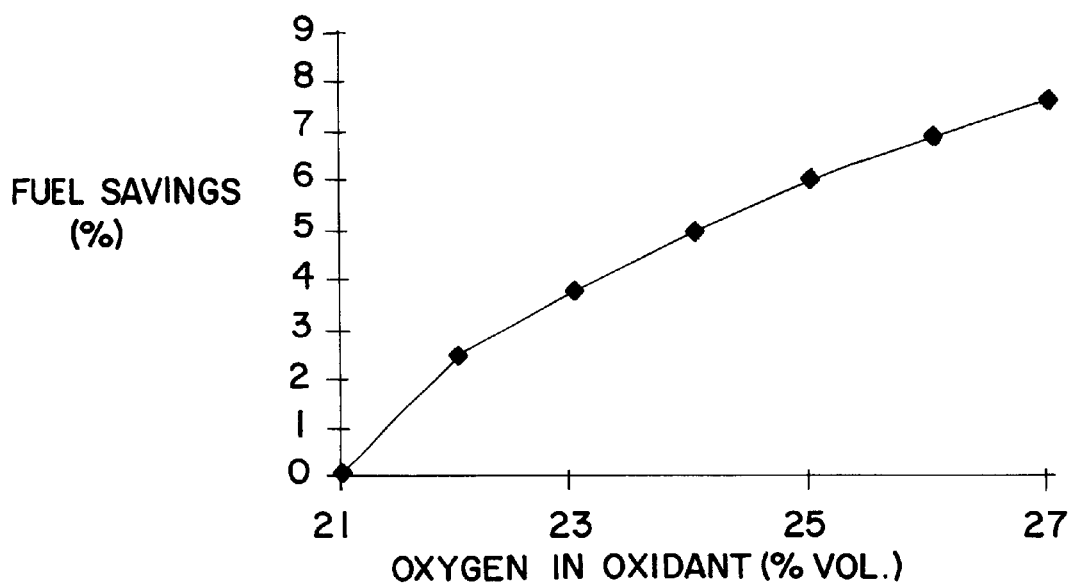
FIG. 5 is a plot of fuel savings versus oxygen concentration obtained by operating a steam-generating boiler in accordance with the invention.

A value for $\Theta$ can be calculated from the excess oxygen ratio $\lambda$, where $\lambda = m_{O_2,in}/m_{O_2,stoichiometric}$ and the amount of oxygen in an oxidant introduced into the boiler given by a nondimensional variable o, where o=( 79−$O_a$)/(21+$o_a$), where $o_a$ is the volumetric oxygen percentage over that contained in air (assumed to be 21%). A relationship for Θ is given in terms of λ and o by Equation (5).

$$\Theta = 1 + 2.667\lambda + 2.334\lambda o. \quad (5)$$

Where the coefficients 2.667 and 2.334 are estimated for pure carbon combustion. The recirculated flue gas RC can be expressed as a fraction of the total gas mass flow rate flowing through the boiler $m_{total}$ as shown by Equation (6).

$$RC = \frac{\dot{m}_R}{\dot{m}_{total}} = 1 - FS\frac{\Theta_o}{\Theta_{bc}}. \quad (6)$$

Where FS is the fuel savings in percent as compared with air combustion. For carbon combustion, the fuel savings FS as determined by Equation (3) can be calculated for different oxygen enrichment levels. FIG. 5 illustrates a plot of fuel savings versus oxygen concentration obtained by means of the foregoing analysis. The plot indicates that, as the oxygen concentration increases, the amount of fuel saved versus that necessary for air combustion increases steadily from 0% to almost 8% as the oxygen concentration varies from 21% to 27% by volume.

Figure 6:
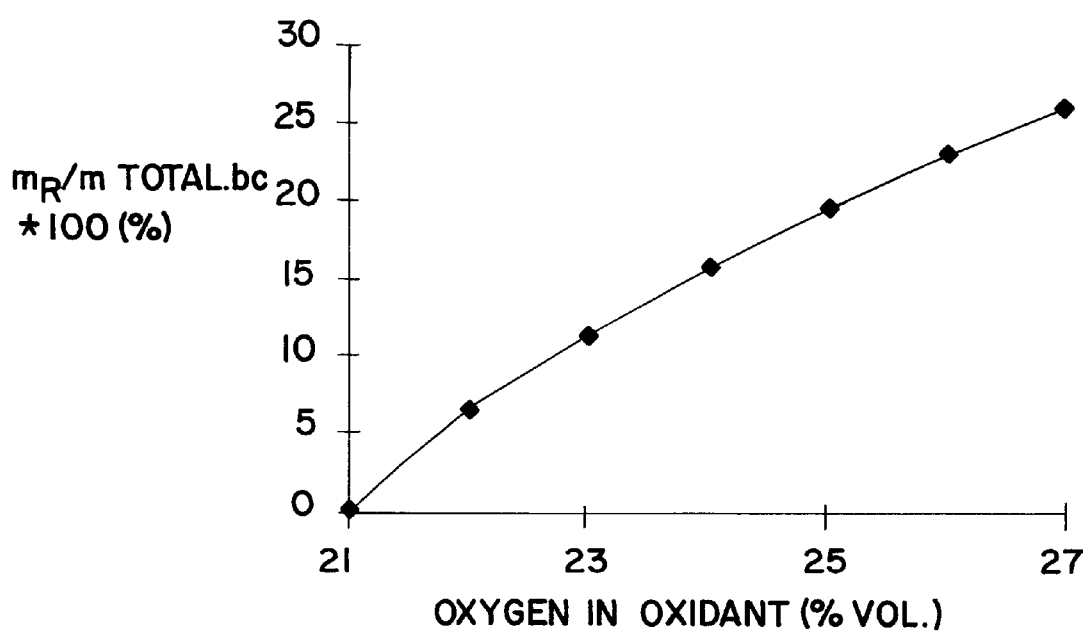
FIG. 6 is a plot of recirculation ratio versus oxygen concentration for the operation of a steam-generating boiler in accordance with the inventions and FIG. 7 is a plot of recirculation ratio versus oxygen concentration for the operation of a steam-generating boiler at oxygen concentrations up to 100% in accordance with the invention.

FIG. 6 is a plot of RC versus oxygen concentration in percent by volume. The values for RC are determined from Equation (6) and represent the amount of flue gas recirculation normalized by the total mass flow rate through the boiler. As indicated in the plot of FIG. 6, recirculation levels can be increased steadily from 0% to slightly more than 25% as the oxygen concentration varies from 21% to 27% by volume. This is well within acceptable limits for standard air combustion boiler design. Further, it is important to note that the temperature profile in the boiler is maintained at design levels such that heat transfer patterns within the boiler are not adversely effected.

It is important to note that the data shown in FIGS. 5 and 6 are theoretical estimates for pure carbon combustion. For other fuels used in actual boiler operation, the specific results will vary from that shown in FIGS. 5 and 6, however, the general trends will be the same.

The foregoing analysis indicates that oxygen-enriched air can be used in a convectional steam-generating boiler, while preserving the heat transfer patterns, flame temperature and total mass flow rate at air combustion designed levels. In a preferred embodiment, the oxygen concentration in the oxygen-enriched air varies from greater than 21% to about 100% by volume. In a more preferred embodiment, the oxygen concentration in the oxygen-enriched air varies from about 22% to about 100% by volume. In a still more preferred embodiment of the invention, the oxygen concentration in oxygen-enriched air varies from about 21% to about 28% by volume. In a still more preferred embodiment of the invention, the oxygen concentration in the oxygen-enriched air varies from about 21% to about 40% by volume. In a most preferred embodiment, the oxygen concentration in the oxygen-enriched air varies from about 23% to about 28% by volume. Further, where the oxygen concentration varies from about 21% to about 28% by volume, a preferred recirculation rate is about 0% to 50% by volume of total flue gas and a more preferred flue gas recirculation rate is about 10% to 30% by volume of total flue gas.

Figure 7:
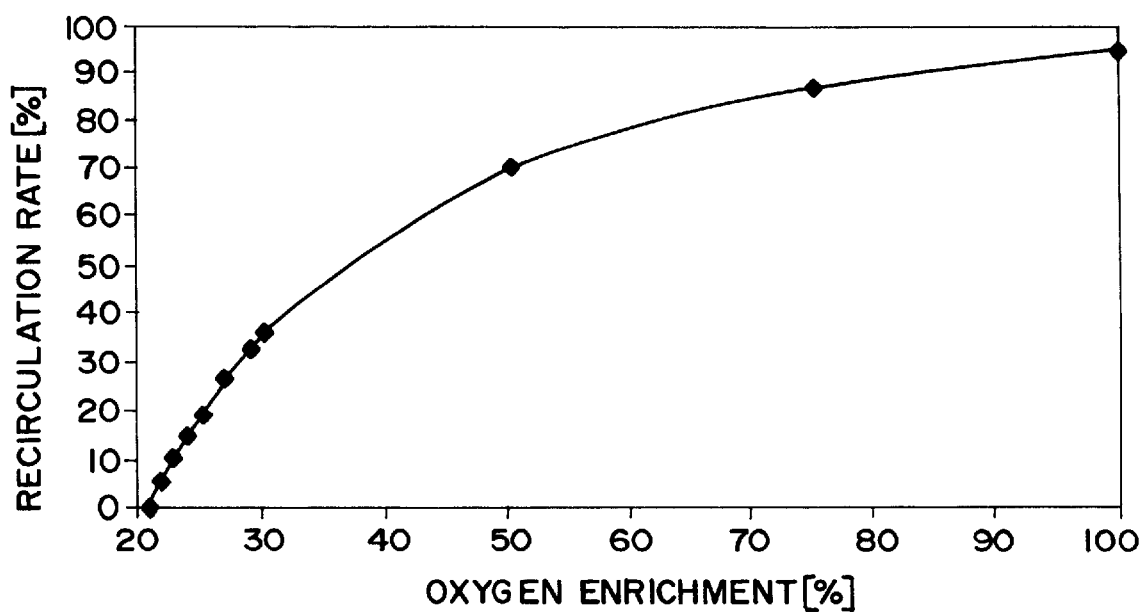

FIG. 7 is a plot of RC versus oxygen concentration in percent by volume for values of oxygen concentration up to 100%. The values for RC are again determined from Equation (6). The plot shows that, as the oxygen enrichment level exceeds about 50%, the optimal recirculation ratio levels off. At 100% oxygen, the RC is about 95%. The data indicates that, as the oxygen concentration exceeds about 50%, an RC of about 70% or more is needed to maintain normal steam-generating boiler operation. Accordingly, it is within the scope of the invention to operate a steam-generating boiler at a recirculation ratio that varies from about 0% to about 95% depending upon the oxygen concentration in the oxygen-enriched air.

The advantages of operating a steam-generating boiler in accordance with the invention can be shown through computer modeling by means of a CFD model named "ATHENA®" software developed by Air Liquide. The CFD model assumes an 18t/h saturated steam boiler using methane gas and having a $T_v$=500 K, where $T_v$ is the steam vaporization temperature. Assuming equal heat transfer rates to the walls of the boiler, the model can calculate the fuel savings for air combustion and oxygen-enriched combustion with 23% by volume oxygen. The calculated fuel consumption and the contribution to the total heat transfer within the boiler from radiation and convection is shown in Table I below.

TABLE I

| Parameter | Air-Fuel Combustion | Oxygen-Enriched Combustion | Full Oxygen-Enriched Combustion with Recirculation |
|---|---|---|---|
| Fuel consumption | 100% | 94% | 96.6% |
| Radiative transfer contribution to total heat transfer | 63% | 67% | 64% |
| Convective transfer contribution to total heat transfer | 37% | 33% | 36% |

The calculated results in Table I show that as the concentration of oxygen and the oxidant increases, the contribution of radiation to the overall heat transfer to the walls increases by about 4% compared to the air combustion case. Additionally, operation of the boiler by oxygen-enriched combustion reduces the fuel consumption by about 6% compared to the air combustion case.

Table I also indicates the calculated fuel consumption and radiative and convective heat transfer contributions for oxygen-enriched operation with flue gas recirculation. Flue gas recirculation can modify the heat transfer patterns within the boiler because of increased flame temperatures. In accordance with the invention, the use of flue gas recirculation with oxygen-enrichment reduces the disruption to the heat transfer patterns. As in the non-recirculation case, the oxygen concentration in the oxygen-enriched combustion is about 23% by volume. The results shown in Table I for oxygen-enriched combustion with recirculation assume a 12% flue gas recirculation rate at a temperature of about 500 K. As indicated in Table I, flue gas recirculation leads to a fuel savings of about 3.4% as compared with air combustion. It is important to note that, although the recirculation results in more moderate fuel savings when compared with nonrecirculation, oxygen-enriched combustion, the recirculation preserves the original heat transfer patterns, which can be an important factor for boiler operation. The recirculated flue gas flow rate can be decreased for higher recirculated gas temperatures.

In many circumstances, it is important that the boiler operate under basic design parameters such as a constant total gas flow rate. In Table II, modeling results are shown for operation of a boiler in accordance with the present invention using oxygen-enriched air containing an oxygen concentration of about 23% by volume without flue gas recirculation.

TABLE II

| Parameter | Air-Fuel Combustion | Oxygen-Enriched Combustion |
| --- | --- | --- |
| Flue gas mass flow rate | 100% | 100% |
| Heat transfer to the load | 100% | 113% |
| Fuel consumption | 100% | 109% |

The modeling calculations shown in Table II indicate a 13% increase in heat transfer to the load when using oxygen-enriched combustion as compared to air combustion, while only increasing fuel consumption by about 9%.

In accordance with the heat transfer improvement, flow pattern and temperature profile preservation aspect of the invention, the total of oxygen introduced into boiler 10 can be distributed through the various introduction sites in radiation zone 12 and convection zone 14. For example, where it is sought to maximize the fuel savings in the operation of boiler 10, oxygen or oxygen-enriched air can be introduced through oxidant lines 24, 28, 31 and 34. In a preferred embodiment, about 0% to about 80% of the total oxygen is introduced through oxidant line 24, about 0% to about 100% of the total oxygen is introduced through oxidant line 28, about 0% to about 50% of the total oxygen is introduced through oxidant line 31 and about 0% to about 50% of the total oxygen is introduced through oxidant line 34. Additionally, where increased production of steam is sought, the total oxygen introduced into boiler 10 can be distributed through oxidant lines 24, 28, 31 and 34. In a preferred embodiment, about 0% to about 100% is introduced through oxidant line 24, about 0% to about 80% through oxidant line 28, about 0% to about 40% through oxidant line 31 and about 0% to about 60% through oxidant line 34.

Where reduced $NO_x$ emissions are desired, the total oxygen introduced into boiler 10 can be distributed by oxidant line 31 and 34. Preferably, about 50% to about 100% of the total oxygen can be introduced through oxidant line 31 and about 0% to about 50% can be introduced through oxidant line 34.

Where it is desired to operate boiler 10 with a low-calorie fuel, the total oxygen in boiler 10 can be introduced by distributing the oxygen through oxidant line 31, oxidant line 34 and oxygen-fuel burner 42. Preferably, about 0% to about 30% of the total oxygen is introduced through oxidant line 31, about 0% to about 20% through oxidant line 34 and about 0% to about 100% through oxygen-fuel burner 42. In all the foregoing cases, the total oxygen distributed through the various oxidant lines and in the case of the use of low-calorie fuel, through the oxygen-fuel burner equals 100% of the total oxygen introduced into boiler 10.

It is important to note that, although the foregoing oxygen distribution methods address specific boiler operating goals, one particular distribution method does not exclude the other operating improvements. All the foregoing oxygen distribution methods can be combined with flue gas recirculation such that flue gas flow rate and heat transfer patterns remain relatively unchanged. Additionally, as previously described, the flue gas recirculation can be employed in both the radiation zone and the convection zone for enhancing the heat transfer within boiler 10.

Thus, it is apparent that there has been disclosed, in accordance with the invention, a method for operating a boiler using oxygen-enriched oxidants that fully provides the advantages set forth above. Although the invention has been described and illustrated with reference to specific illustrative embodiments thereof, it is not intended that the invention be limited to those illustrative embodiments. Those skilled in the art will recognize that variations and modifications can be made without departing from the spirit of the invention. It is therefore intended to include within the invention all such variations and modifications as fall within the scope of the appended claims and equivalents thereof.

What is claimed is:

1. A method of operating a steam-generating boiler including a radiation zone and a convection zone comprising:

introducing fuel into a combustion space within the boiler;

introducing oxygen premixed with preheated air into one of the radiation zone and the convection zone,
wherein the oxygen concentration in air is about 21 to about 100% by volume oxygen combusting the fuel and oxygen-enriched air to generate thermal energy in the combustion space; and collecting flue gases and recirculating the flue gases into the radiation zone and the convection zone.

2. A method of operating a steam-generating boiler including a radiation zone and a convection zone comprising:

introducing fuel into a combustion space within the boiler;

introducing oxygen-enriched air into the combustion space,
wherein the oxygen-enriched air contains about 21% to about 100% by volume oxygen;

combusting the fuel and oxygen-enriched air to generate thermal energy in the combustion space; and collecting at least a portion of flue gases and recirculating at least a portion of the flue gases through the boiler,
wherein introducing oxygen-enriched air comprises injecting oxygen-enriched air into the radiation zone and into the convection zone and wherein recirculating the flue gas comprises introducing the recirculated flue gas into the radiation zone and into the convection zone.

3. A method of operating a steam-generating boiler including a radiation zone and a convection zone comprising:

introducing fuel into a combustion space within the boiler;

introducing oxygen-enriched air into the combustion space,
wherein the oxygen-enriched air contains about 21% to about 100% by volume oxygen;

combusting the fuel and oxygen-enriched air to generate thermal energy in the combustion space; and collecting at least a portion of flue gases and recirculating at least a portion of the flue gases into the radiation zone and the convection zone, such that the relationship $$RC = 1 - FS \frac{\Theta_o}{\Theta_{bc}}$$

is maintained, where RC is a flow rate ratio of oxygen-enriched air to recirculated flue gas, FS is the ratio of fuel consumption between oxygen-enriched air combustion and air combustion, and $\Theta_{bc}$ represents the flow rate ratio between fuel and air, and fuel, for air combustion and $\Theta_o$ represents the flow rate ratio between fuel and oxygen-enriched air and fuel for oxygen-enriched combustion.

4. A method of operating a steam-generating boiler including a radiation zone and a convection zone comprising:
   introducing fuel into a combustion space within the boiler;
   introducing oxygen-enriched air into the combustion space injecting oxygen-enriched air into the radiation zone and into the convection zone,
      wherein the oxygen-enriched air contains about 21% to about 100% by volume oxygen;
   combusting the fuel and oxygen-enriched air to generate thermal energy in the combustion space; and
   collecting at least a portion of flue gases and recirculating at least a portion of the flue gases through the boiler,
      wherein recirculating the flue gas comprises introducing the recirculated flue gas into the radiation zone and into the convection zone.

5. A method of operating a steam-generating boiler including a convection zone and a radiation zone, wherein the steam-generating boiler is designed for air combustion using air combustion design tolerances, the method comprising:
   introducing fuel into a combustion space within the boiler;
   introducing oxygen-enriched air into the combustion space,
      wherein the oxygen-enriched air contains about 21% to about 100% by volume oxygen,
   combusting the fuel and oxygen-enriched air to generate thermal energy in the combustion space; and
   collecting at least a portion of flue gases and recirculating at least a portion of the flue gases to the convection zone and the radiation zone,
      wherein the recirculated flue gases are introduced at a flow rate that does not exceed air combustion design tolerances of the steam-generating boiler.

6. A method of operating a steam-generating boiler including a radiation zone and a convection zone comprising:
   introducing a low calorie fuel into a combustion space within the boiler;
   introducing about 0 to about 100% by volume of oxygen-enriched air through a low-calorific fuel oxygen burner located in a lower region of the radiation zone, about 0 to about 30% by volume through an inlet located intermediate to the lowest point of the radiation zone and the interface of the radiation zone and the convection zone, and about 0 to about 20% by volume of oxygen-enriched air through an inlet located in an upper region of the convection zone, and combinations thereof,
      wherein the total volume of oxygen-enriched air from all inlets equals 100%, and
      wherein the oxygen-enriched air contains about 21% to about 100% by volume oxygen;
   combusting the fuel and oxygen-enriched air to generate thermal energy in the combustion space; and
   collecting at least a portion of flue gases and recirculating at least a portion of the flue gases into the convection zone and radiation zone.

* * * * *

UNITED STATES PATENT AND TRADEMARK OFFICE
CERTIFICATE OF CORRECTION

PATENT NO. : 6,314,896 B1
DATED : November 13, 2001
INVENTOR(S) : Ovidiu Marin et al.

It is certified that error appears in the above-identified patent and that said Letters Patent is hereby corrected as shown below:

Title page,
Item [75], Inventors, please replace the name, "Oliver" with the name -- Olivier --.

Column 10,
Line 61, please delete the period, ".", from the end of the line.

Signed and Sealed this

Fourth Day of June, 2002

Attest:

Attesting Officer

JAMES E. ROGAN
Director of the United States Patent and Trademark Office